(12) United States Patent
Banks, Jr. et al.

(10) Patent No.: US 12,150,413 B2
(45) Date of Patent: Nov. 26, 2024

(54) CLOSED LOOP CONTROL OF TAILINGS PROCESSOR AGGRESSIVENESS

(71) Applicant: CNH Industrial America LLC, New Holland, PA (US)

(72) Inventors: Clayton E. Banks, Jr., Brownstown, PA (US); Dré W. J. Jongmans, AG Klundert (NL); Thomas Mahieu, Ypres (BE); Bart M. A. Missotten, Herent (BE); William Mark McCully, Lancaster, PA (US)

(73) Assignee: CNH Industrial America LLC, Holland, PA (US)

( * ) Notice: Subject to any disclaimer, the term of this patent is extended or adjusted under 35 U.S.C. 154(b) by 799 days.

(21) Appl. No.: 17/380,728

(22) Filed: Jul. 20, 2021

(65) Prior Publication Data

US 2021/0345551 A1     Nov. 11, 2021

Related U.S. Application Data

(63) Continuation of application No. 16/349,118, filed as application No. PCT/US2017/061076 on Nov. 10, 2017, now Pat. No. 11,076,533.

(Continued)

(30) Foreign Application Priority Data

Jan. 3, 2017 (BE) .................................. 2017/5000

(51) Int. Cl.
*A01F 12/52* (2006.01)
*A01D 41/127* (2006.01)
*A01F 12/18* (2006.01)

(52) U.S. Cl.
CPC ............ *A01F 12/52* (2013.01); *A01D 41/127* (2013.01); *A01F 12/18* (2013.01); *A01F 2012/188* (2013.01)

(58) Field of Classification Search
CPC .... A01F 12/52; A01F 12/18; A01F 2012/188; A01D 41/127
See application file for complete search history.

(56) References Cited

U.S. PATENT DOCUMENTS 3,115,142 A    12/1963   Kepkay
3,247,855 A    4/1966   Kepkay
(Continued)

FOREIGN PATENT DOCUMENTS

CA         2217320 A1 *   4/1998   .......... A01D 41/127
CN       203661659 U *   6/2014   .......... A01D 41/127
(Continued)

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A system for controlling the aggressiveness of a tailings processor that re-threshes tailings received from the grain cleaning system in an agricultural harvester is provided with at least one imaging device to image a grain sample. At least a portion of the grain sample has at least once passed through the tailings processor. A controller is connected to the imaging device and to an arrangement to automatically adjust the aggressiveness of the tailings processor. The controller is configured to automatically adjust the aggressiveness of the tailings processor using the arrangement, based on based on the level of broken grain and/or unthreshed grain determined from the image from the at least one imaging device by comparing the level of broken grain and/or unthreshed grain to the desired level.

20 Claims, 9 Drawing Sheets

Related U.S. Application Data

(60) Provisional application No. 62/420,083, filed on Nov. 10, 2016.

(56) References Cited

U.S. PATENT DOCUMENTS

| | | | |
|---|---|---|---|
| 3,976,084 A | 8/1976 | Weber | |
| 4,296,409 A * | 10/1981 | Whitaker | G07C 5/0825 |
| | | | 702/182 |
| 4,348,855 A | 9/1982 | DePauw et al. | |
| 4,441,513 A * | 4/1984 | Herwig | G01V 8/12 |
| | | | 460/13 |
| 4,490,964 A * | 1/1985 | Eldredge | G01N 29/46 |
| | | | 56/DIG. 15 |
| 4,517,792 A * | 5/1985 | Denning | A01D 41/1273 |
| | | | 56/DIG. 15 |
| 5,421,777 A | 6/1995 | Strubbe et al. | |
| 6,036,597 A | 3/2000 | Arner | |
| 6,053,811 A | 4/2000 | Johnson et al. | |
| 6,119,442 A | 9/2000 | Hale | |
| 6,342,006 B1 | 1/2002 | Bauch et al. | |
| 7,630,809 B2 | 12/2009 | Behnke et al. | |
| 9,510,513 B2 * | 12/2016 | Wilde Von Wildemann | A01F 12/52 |
| 10,058,029 B2 * | 8/2018 | Bischoff | A01D 41/127 |
| 10,318,138 B2 | 6/2019 | Scholer et al. | |
| 2003/0066277 A1 * | 4/2003 | Behnke | A01D 41/127 |
| | | | 56/10.2 R |
| 2003/0216159 A1 | 11/2003 | Van Der Haegen et al. | |
| 2005/0009591 A1 | 1/2005 | Duquesne et al. | |
| 2005/0137003 A1 * | 6/2005 | Behnke | A01D 41/1276 |
| | | | 460/1 |
| 2005/0143153 A1 * | 6/2005 | Behnke | A01F 12/52 |
| | | | 460/4 |
| 2005/0186997 A1 * | 8/2005 | Ho | A01D 41/127 |
| | | | 460/1 |
| 2006/0272307 A1 * | 12/2006 | Behnke | A01D 41/127 |
| | | | 56/10.2 R |
| 2007/0056258 A1 | 3/2007 | Behnke | |
| 2008/0318648 A1 * | 12/2008 | Baumgarten | A01D 41/1273 |
| | | | 460/5 |
| 2010/0217481 A1 * | 8/2010 | Baumgarten | A01D 41/127 |
| | | | 460/100 |
| 2012/0004815 A1 | 1/2012 | Behnke | |
| 2013/0332003 A1 | 12/2013 | Murray et al. | |
| 2014/0019018 A1 * | 1/2014 | Baumgarten | A01D 41/127 |
| | | | 701/50 |
| 2014/0050364 A1 | 2/2014 | Brueckner et al. | |
| 2015/0009328 A1 | 1/2015 | Escher et al. | |
| 2015/0046043 A1 * | 2/2015 | Bollin | B60W 50/08 |
| | | | 701/50 |
| 2015/0293507 A1 * | 10/2015 | Burns | A01D 41/127 |
| | | | 700/83 |
| 2016/0081271 A1 * | 3/2016 | Mott | G05B 15/02 |
| | | | 701/50 |
| 2017/0311543 A1 | 11/2017 | Leenknegt et al. | |
| 2018/0000011 A1 | 1/2018 | Schleusner et al. | |

FOREIGN PATENT DOCUMENTS

| | | | | |
|---|---|---|---|---|
| CN | 106508257 A * | 3/2017 | | A01D 41/1278 |
| EP | 1470749 A1 | 10/2004 | | |
| EP | 2064941 A1 | 6/2009 | | |
| EP | 2510777 A1 * | 10/2012 | | A01D 41/1276 |
| EP | 3097760 A1 | 11/2016 | | |
| EP | 3238528 B1 * | 8/2019 | | A01D 41/1271 |
| EP | 3566564 A1 * | 11/2019 | | A01D 41/127 |
| JP | 2004065247 A * | 3/2004 | | A01F 12/32 |
| WO | 2009/034442 A2 | 3/2009 | | |

* cited by examiner

|  | Desired broken grain/unthreshed content | | |
|---|---|---|---|
| Calculated broken grain/unthreshed content | Low | Medium | High |
| Low | No change | Decrease clearance | Decrease clearance |
| Medium | Increase clearance | (user priority selectable) Decrease/Increase clearance/no change | Decrease clearance |
| High | Increase clearance | Decrease clearance | Open lower sieve & decrease clearance |

FIG. 10

CLOSED LOOP CONTROL OF TAILINGS PROCESSOR AGGRESSIVENESS

CROSS REFERENCE TO RELATED APPLICATIONS

This is a continuation of U.S. patent application Ser. No. 16/349,118, entitled "CLOSED LOOP CONTROL OF TAILINGS PROCESSOR AGGRESSIVENESS", filed Mar. 5, 2021, which is incorporated herein by reference.

FIELD OF THE INVENTION

The present invention relates to agricultural harvesters, and, more specifically to tailings processors in the grain cleaning system of agricultural harvesters.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Meanwhile, incompletely cleaned grain, called tailings, may include incompletely threshed or unthreshed crop, free grains of completely threshed crop, and other plant material or Material Other than Grain (MOG). Such tailings from the upper or lower sieve having fallen onto the tailings auger pan are recycled through the cleaning system. Often, a return auger or tailings conveyance receives the tailings from a tailings auger at the forward end of the auger pan, and lifts the tailings vertically in order to recycle the tailings through the threshing and separating or cleaning system. Between the tailings auger and the return auger or tailings conveyance, a tailings processor may be provided, which functions to further thresh the tailings before they are returned to the cleaning system.

The aggressiveness of the tailings processor is controlled by increasing or decreasing the radial or threshing clearance between the rasps on the rotating drum of the tailings processor and a portion of the cylindrical housing, typically the housing floor. Different crops and different harvest conditions require different levels of tailings processor aggressiveness in order to effectively re-thresh the tailings that have passed through the cleaning system. Previously, determining and optimizing the effectiveness of the tailings processor was often a cumbersome process of trial and error, involving visually inspecting the output of the tailings processor or the grain in the grain tank of the combine, and manually adjusting the radial or threshing clearance of the tailings processor, such manual adjustment being involved and time-consuming.

For example, U.S. Pat. No. 3,247,855 teaches manually adjusting the running clearance between the impeller blades and the wall of a tailings unit mounted at the top of a tailings conveyance that returns tailings to the cleaning system. The running clearance is adjusted using eccentric blocks that mount the axle of the impeller, and with a handle connected thereto that has preset positions. E.P. Patent No. 2,064,941 similarly teaches manually adjusting the running clearance between the impeller blades and a wall of the rethreshing housing using an adjustable wall. International Patent Application No. WO 2009034442A2 similarly teaches a rethreshing housing located at the top of the return auger that delivers tailings back to the cleaning system, wherein the rethreshing concave is manually adjusted using screw threads. U.S. Pat. No. 6,342,006 teaches using a kernel counting sensor to determine how much grain is passing back to the primary threshing system of the combine, and then adjusting the settings of this primary threshing system. A sieve on an output auger of the tailings elevator or auger conveyer is adjustable to control the dropping of grain on the kernel counting sensor, but the aggressiveness of a tailings processor is not automatically adjusted, no separate tailings processor being provided.

U.S. Pat. No. 4,348,855 teaches a sieve system at the top of the grain elevator of the combine that determines the ratio of damaged to undamaged grain by separating the damaged grain, which subsequently impacts a transducer. The system then varies the speed of the primary threshing rotor to minimize grain damage while operating at the highest rotor speed that will work. However, no tailings processor is involved. U.S. Published Application No. 20030216159 teaches a tool for removing the threshing concaves of a transverse rotor combine. A concave adjustment mechanism is provided using one or more actuators. However, again, this adjustment is to the concaves of the primary threshing and separating system, not to the aggressiveness of a tailings processor. U.S. Published Application No. 20050009591 teaches a concave of a main transverse threshing rotor that has a hinged end portion with a bridging device between the hinged end portion and the remainder of the threshing system. However, again, this adjustment is to the concaves of the primary threshing and separating system, not to the aggressiveness of a tailings processor.

What is needed in the art, therefore, is a system and method for optimizing the effectiveness of the tailings processor without requiring the process of trial and error on the part of the operator, and subsequent manual adjustment of the radial or threshing clearance of the tailings processor.

SUMMARY OF THE INVENTION

The present invention provides such a way to optimize the effectiveness of the tailings processor. Embodiments of the present invention are implemented on the tailings processor that functions to further thresh tailings before they are recycled through the cleaning system of the agricultural harvester. The tailings processor may be provided with rasps on a rotating drum rotating within a cylindrical housing. The cylindrical housing has a housing floor, which may or may not be provided with lugs in order to further enhance the threshing action of the tailings processor. A sensor or grain camera may be attached to the outlet of the grain elevator of the combine, or to the cylindrical housing of the tailings processor, or elsewhere in the cleaning system or subsequent grain handling machinery of the combine, in order to determine the effectiveness of the further threshing of the tailings. The information provided by the sensor or grain camera is used to adjust the aggressiveness of the tailings processor in order to optimize the re-threshing of the tailings.

The rasps of the rotating drum pass within a radial or threshing clearance of the housing floor of the tailings processor as the rotating drum turns. The aggressiveness of the tailings processor is largely controlled by varying this radial or threshing clearance. Different crops and different harvest conditions require different levels of tailings processor aggressiveness in order to effectively re-thresh the tailings that have passed through the cleaning system. Specifically, if too many pods, ears, or spikes of unthreshed grain pass through the tailings processor, then it is necessary to reduce the radial or threshing clearance in order to increase the tailings processor aggressiveness. On the other hand, if too much grain or too many kernels are broken in the tailings processor, then it is necessary to increase the radial or threshing clearance in order to decrease the tailings processor aggressiveness. Adjusting mechanisms are operable to increase or decrease the radial or threshing clearance by lowering or raising a housing floor of the cylindrical housing of the tailings processor, using one or more actuators.

The sensor or grain camera, which is connected to a control system or controller, cooperates with the control system or controller in order to determine if too many pods, ears, or spikes of unthreshed grain are passing through the tailings processor, or if too much grain or too many kernels are being broken in the tailings processor. If the control system or controller determines in cooperation with the sensor or grain camera that too many pods, ears, or spikes of unthreshed grain are passing through the tailings processor, then it determines that it is necessary to reduce the radial or threshing clearance in order to increase the tailings processor aggressiveness. The controller or control system then raises the housing floor using adjusting mechanisms. Following this adjustment, the control system or controller again cooperates with the sensor or grain camera to determine if too many pods, ears, or spikes of unthreshed grain are still passing through the tailings processor, or if too much grain or too many kernels are now being broken in the tailings processor, and makes further adjustment to the radial or threshing clearance as necessary, in closed loop fashion and in real time.

If the control system or controller determines in cooperation with the sensor or grain camera that too much grain or too many kernels are being broken in the tailings processor, then it determines that it is necessary to increase the radial or threshing clearance in order to decrease the tailings processor aggressiveness. The controller or control system then lowers the housing floor using adjusting mechanisms. Again, following this adjustment, the control system or controller once more cooperates with the sensor or grain camera to determine if too much grain or too many kernels are still being broken in the tailings processor, or if too many pods, ears, or spikes of unthreshed grain are now passing through the tailings processor, and makes further adjustment to the radial or threshing clearance as necessary, in closed loop fashion and in real time.

An indicator or indicators may be connected to one or to each of the adjusting mechanisms in order to give visual feedback on the current amount of radial or threshing clearance to an operator conducting a visual inspection. Alternately, feedback may be provided to the operator in the operator cab of the combine by way of a gauge or other visual or audio device, or by way of an electronic yield monitor device. The sensor or grain camera is capable and operates to image grain having been re-threshed by the tailings processor. The sensor or grain camera may be a digital camera producing digital images that are subsequently processed by the controller or control system. Alternately, the sensor or grain camera may be another type of sensor with imaging capabilities, such as ultrasound, thermal or infrared imaging, or radar imaging, as non-limiting examples. Independently or in cooperation with the control system or controller, the sensor or grain camera operates to identify in the grain sample unthreshed grain pods, ears, and spikes, and to identify in the grain sample broken grain. The controller or control system uses this information to increase or decrease the radial or threshing clearance in order to decrease or increase, respectively, the tailings processor aggressiveness in closed loop fashion and in real time, as described above.

The sensor or grain camera may be located upon the outlet of the grain elevator, upon the cylindrical housing of the tailings processor, or elsewhere within the cleaning system, grain elevator, grain tank, or even on the unloading conveyance, provided that at least a portion of the grain sample at that location has previously passed through the tailings processor as tailings. Other such locations where a sensor or grain camera according to an embodiment of the invention may be located include upon the front or rear surface of the tailings processor, attached to the return auger, attached to the bottom pan of the cleaning system, or attached to the clean grain auger, as non-limiting examples.

The invention in one form is directed to a system for controlling the aggressiveness of a tailings processor in an agricultural harvester. The agricultural harvester has a threshing and separating system, a grain cleaning system, a tailings auger and a return auger, a clean grain auger, a grain elevator having an outlet, and a grain tank. The tailings processor functions to re-threshing tailings received from the grain cleaning system. The tailings processor is engaged with the tailings auger and with the return auger, and has a rotating threshing device within a housing. The system is provided with at least one imaging device oriented to image a grain sample, at least a portion of which has at least once passed through the tailings processor. The system is further provided with a controller or control system connected to the imaging device. The tailings processor is provided with an arrangement to automatically adjust the aggressiveness of the tailings processor, which is connected to and controlled by the controller or control system. The controller or control system is configured to automatically adjust the aggressiveness of the tailings processor using the arrangement, based on the level of broken grain and/or unthreshed grain determined from the image from the at least one imaging device by comparing the level of broken grain and/or unthreshed grain to the desired level.

The invention in another form is directed to an agricultural harvester including a chassis, a threshing and separating system carried by the chassis for separating grain from material other than grain, a cleaning system receiving grain from the threshing and separating system for further cleaning the grain, a tailings processor receiving tailings from the cleaning system, and a system for controlling the aggressiveness of the tailings processor. The agricultural harvester further has a tailings auger and a return auger, a clean grain auger, a grain elevator having an outlet, and a grain tank. The tailings processor functions to re-thresh tailings received from the grain cleaning system. The tailings processor is engaged with the tailings auger and with the return auger, and has a rotating threshing device within a housing. The system for controlling the aggressiveness of the tailings processor is provided with at least one imaging device oriented to image a grain sample, at least a portion of which has at least once passed through the tailings processor. The system is further provided with a controller or control system connected to the imaging device. The tailings processor is provided with an arrangement to automatically adjust the aggressiveness of the tailings processor, which is connected to and controlled by the controller or control system. The controller or control system is configured to automatically adjust the aggressiveness of the tailings processor using the arrangement, based on the level of broken grain and/or unthreshed grain determined from the image from the at least one imaging device by comparing the level of broken grain and/or unthreshed grain to the desired level.

An advantage of the present invention is that it automatically optimizes the effectiveness of the tailings processor, so that a minimum of unthreshed grain or broken grain is delivered to the grain tank. Another advantage is that operation of the present invention is largely automatic, requiring a minimum of trial and error, and physical effort, on the part of the operator of the agricultural harvester.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 10 illustrates a decision matrix for controlling the tailings processor of FIG. 4, in accordance with an exemplary embodiment of the present invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material, which may include unthreshed crop, free grains of completely threshed crop, and other Material Other than Grain (MOG), is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
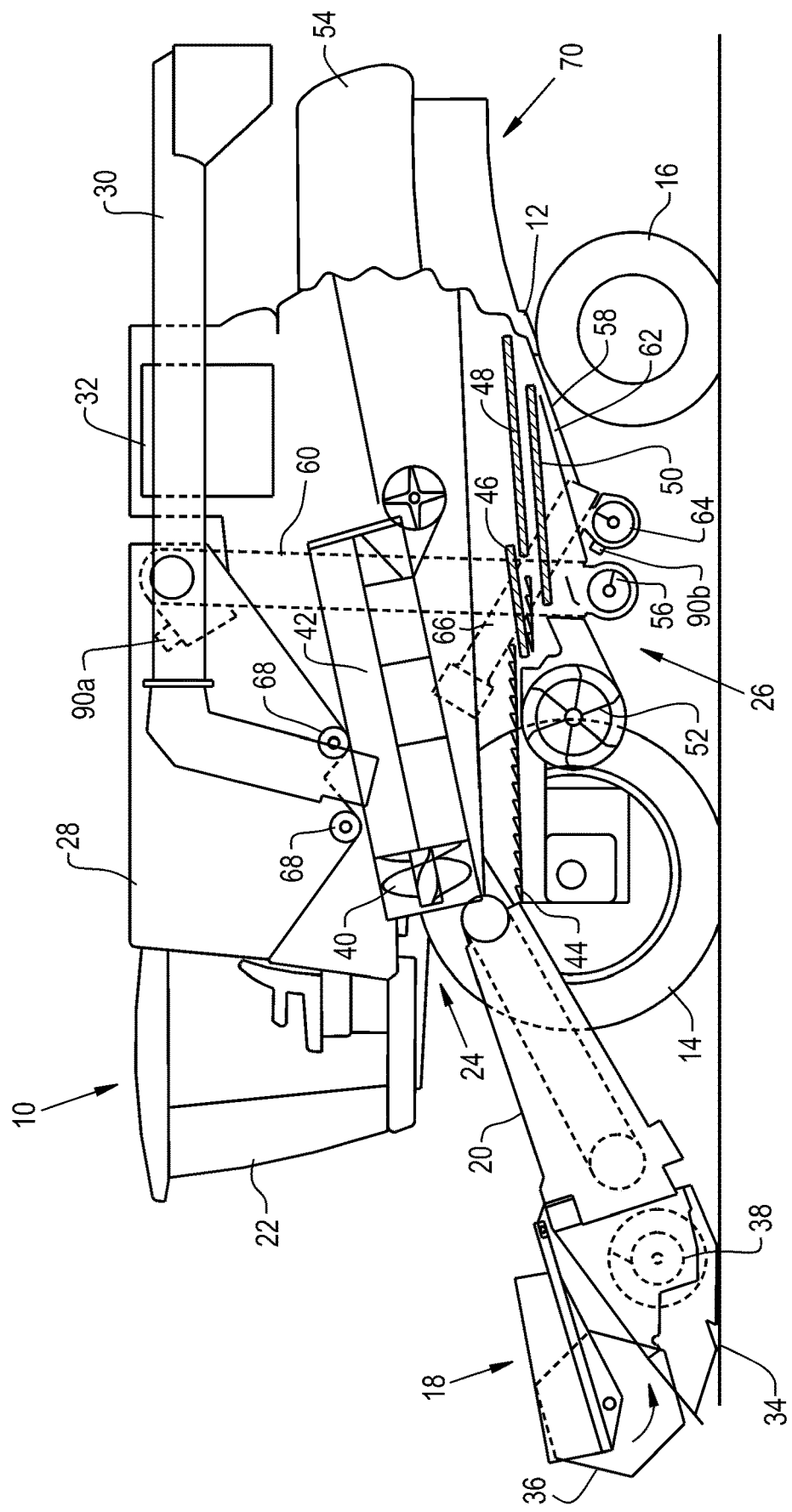
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc. The front wheels 14 are larger flotation type wheels, and rear wheels 16 are smaller steerable wheels. Motive force is selectively applied to the front wheels 14 through a power plant in the form of a diesel engine 32 and a transmission (not shown).

Although the combine 10 is shown as including wheels, is also to be understood that the combine 10 may include tracks, such as full tracks or half-tracks. The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves to remove MOG, residue, chaff, and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. The cross augers 68 at the bottom of the grain tank 28 convey the clean grain within the grain tank 28 to the unloading auger 30 for discharge from the combine 10. A residue handling system 70 integrated in the rear of the harvester 10 receives airborne MOG, residue, and chaff from the threshing and separating system 24 and from the cleaning system 26. Meanwhile, tailings from the cleaning system 26 fall to a tailings auger trough 62. The tailings are transported via tailings auger 64 to a return auger 66, which returns the tailings to the upstream end of the cleaning system 26 for repeated cleaning action.

Figure 2:
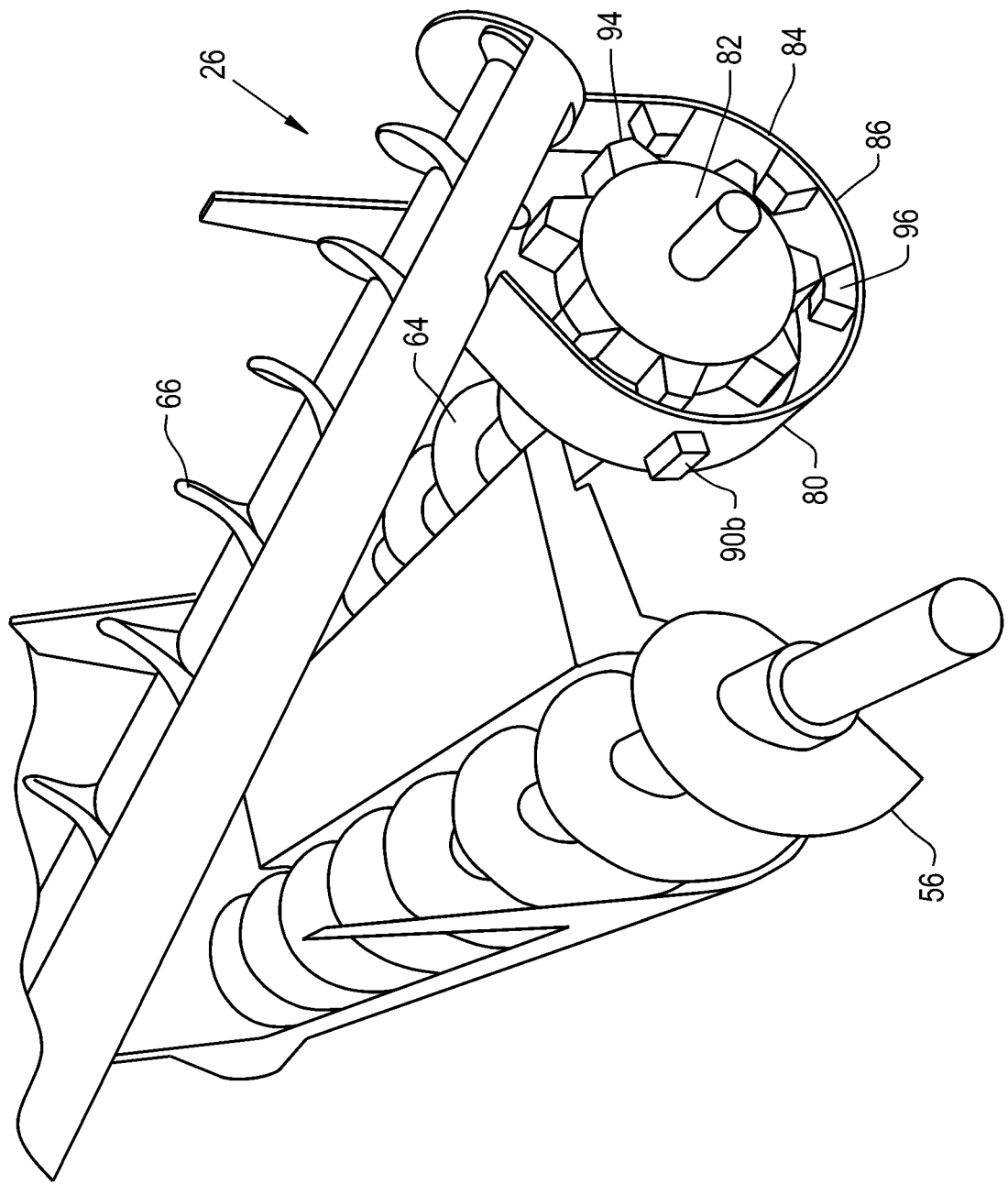
FIG. 2 is an isometric view of a clean grain auger, a tailings auger, a tailings processor, and a return auger, according to an embodiment of the invention.

Turning now to FIG. 2, a partial view is shown of the clean grain auger 56, the tailings auger 64, and the return auger 66 of the cleaning system 26. At the end of the tailings auger 64 where tailings are delivered to the return auger 66 for further transport to the upstream end of the cleaning system 26, a tailings processor 80 according to an embodiment of the present invention is provided. The tailings processor 80 serves to further thresh the tailings on their way back to the upstream end of the cleaning system 26, and is provided with rasps 94 on a rotating drum 82 rotating within a cylindrical housing 84. The cylindrical housing 84 has a housing floor 86, which may or may not be provided with lugs 96 in order to further enhance the threshing action of the tailings processor 80. A sensor or grain camera 90a may be attached to the outlet of the grain elevator 60, as shown in FIG. 1, in order to determine the effectiveness of the further threshing of the tailings. Alternately, the sensor or grain camera 90b may be attached to the cylindrical housing 84 of the tailings processor 80, as shown in FIG. 1 and in FIG. 2. The sensor or grain camera 90a or 90b may be a digital camera producing digital images. Alternately, the sensor or grain 90a or 90b camera may be another type of sensor with imaging capabilities, such as ultrasound, thermal or infrared imaging, or radar imaging, as non-limiting examples. The information provided by the sensor or grain camera 90a or 90b is used to adjust the aggressiveness of the tailings processor 80 in order to optimize the re-threshing of the tailings, as will be shown.

Figure 3:
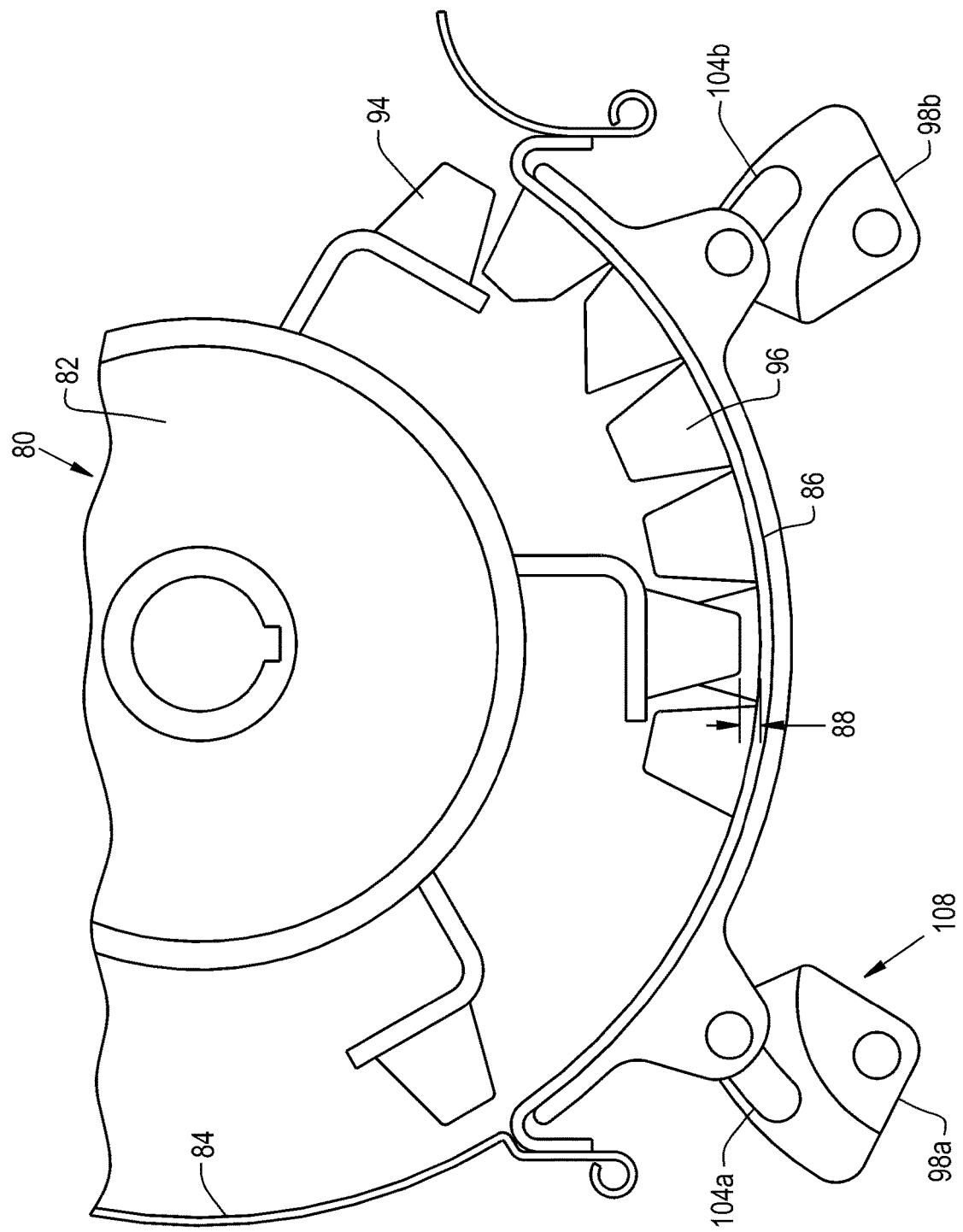
FIG. 3 is a cutaway front view of a tailings processor according to an embodiment of the invention.

Turning now to FIG. 3, a partial view of the workings of the tailings processor 80 is shown. Rasps 94 are again attached to the rotating drum 82 within the cylindrical housing 84, and interact with the lugs 96 attached to the housing floor 86 to further thresh the tailings on their way back to the upstream end of the cleaning system 26 (not shown) as in FIG. 2. As can be seen in FIG. 3, the rasps 94 pass within a radial or threshing clearance 88 of the housing floor 86 as the rotating drum 82 turns. Different crops and different harvest conditions require different levels of tailings processor 80 aggressiveness in order to effectively re-thresh the tailings that have passed through the cleaning system 26. Specifically, if too many pods, ears, or spikes of unthreshed grain pass through the tailings processor 80, then it is necessary to reduce the radial or threshing clearance 88 in order to increase the tailings processor 80 aggressiveness. On the other hand, if too much grain or too many kernels are broken in the tailings processor, then it is necessary to increase the radial or threshing clearance 88 in order to decrease the tailings processor 80 aggressiveness.

Previously, determining and optimizing the effectiveness of the tailings processor was often a cumbersome process of trial and error, involving visually inspecting the output of the tailings processor or the grain in the grain tank of the combine, and manually adjusting the radial or threshing clearance of the tailings processor. In order to remedy this, the housing floor 86 of the tailings processor 80 according to the embodiment of the present invention shown in FIG. 3 is provided with an arrangement 108 to automatically adjust the aggressiveness of the tailings processor 80 in the form of adjusting mechanisms 98a and 98b. The adjusting mechanisms 98a and 98b are operable to increase or decrease the radial or threshing clearance 88 by lowering or raising the housing floor 86, as will be shown in further detail. Each of the adjusting mechanisms 98a and 98b has a cam 104a and 104b, respectively, so that the housing floor 86 is raised in the example shown in FIG. 3 when the right hand adjusting mechanism 98b is rotated clockwise and when the left hand adjusting mechanism 98a is rotated counter-clockwise. The housing floor 86 is lowered in the example shown in FIG. 3 when the right hand adjusting mechanism 98b is rotated counter-clockwise and when the left hand adjusting mechanism 98a is rotated clockwise.

Although the cams 104a and 104b of the adjusting mechanisms 98a and 98b shown in the embodiment of the present invention shown in FIG. 3 are arranged as shown, it is contemplated that the cams 104a and 104b may be arranged to act in the opposite orientation, so that the housing floor 86 is raised when the right hand adjusting mechanism 98b is rotated counter-clockwise and when the left hand adjusting mechanism 98a is rotated clockwise, and lowered when the right hand adjusting mechanism 98b is rotated clockwise and when the left hand adjusting mechanism 98a is rotated counter-clockwise. Further, the adjusting mechanisms 98a and 98b are shown as operating through cams 104a and 104b in the embodiment of the present invention shown in FIG. 3, whereas it is contemplated as being within the scope of the present invention that the adjusting mechanisms 98a and 98b may be embodied as another type of motion transmitting mechanism, such as a linkage, rack and pinion, screw drive, or cable and pulley.

Figure 4:
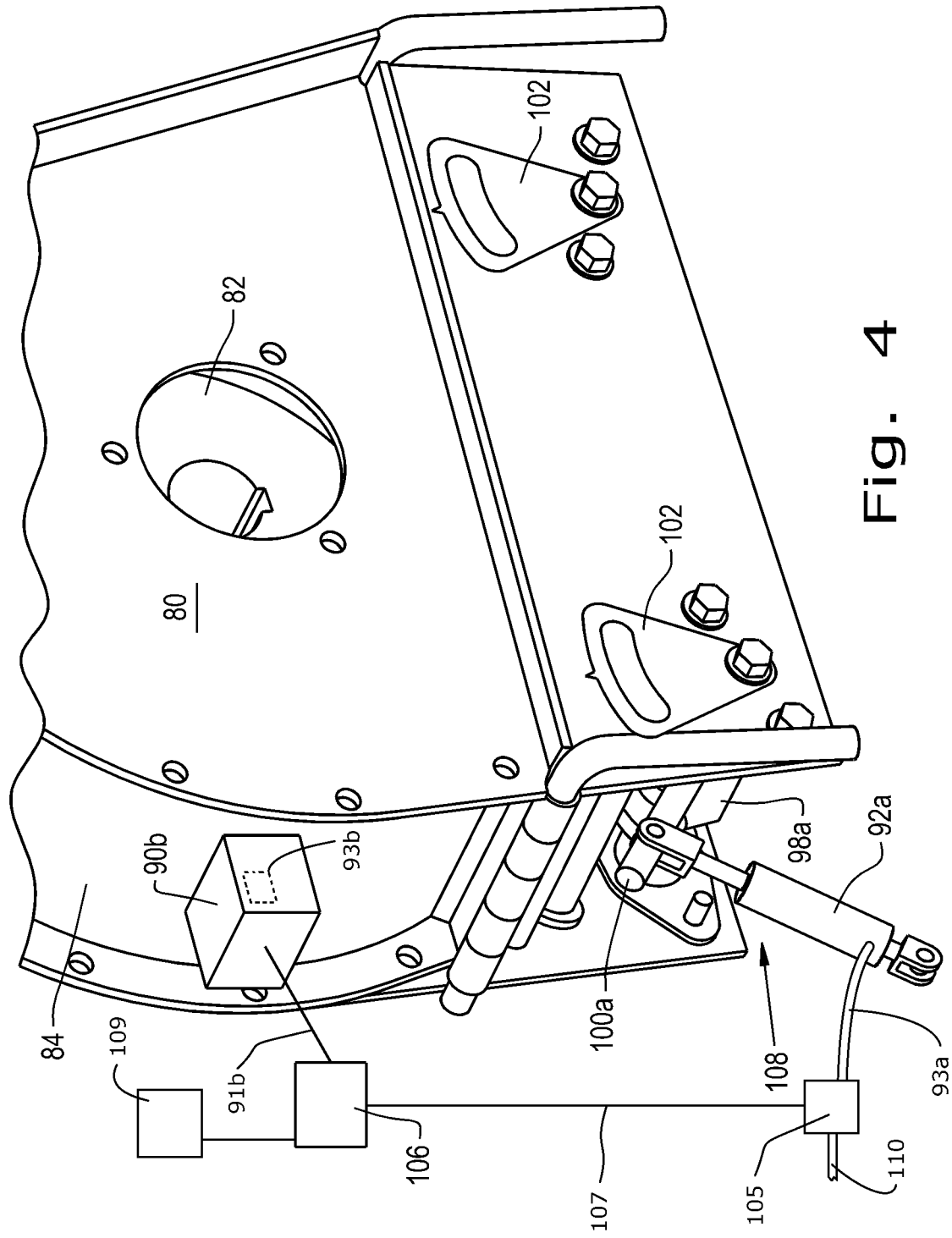
FIG. 4 is an isometric view of a tailings processor according to an embodiment of the invention.

Turning now to FIG. 4, another view of a tailings processor 80 according to an embodiment of the present invention is shown. Rotating drum 82 is partially visible within the cylindrical housing 84, while a sensor or grain camera 90b is shown attached to the outside of the cylindrical housing 84. The left hand adjusting mechanism 98a is partially visible beneath the tailings processor 80, and is provided with an actuator 92a connected to a lever arm 100a that operates to rotate the left hand adjusting mechanism 98a, thereby raising or lowering the housing floor 86 (not visible in FIG. 4). The actuator 92a is connected at its other end to a firm mounting point, such as the chassis 12 of the combine 10. The right hand adjusting mechanism 98b (not visible) is similarly provided with an actuator 92b connected to a lever arm 100b that operates to rotate the right hand adjusting mechanism 98b. An indicator or indicators 102 may be connected to one or to each of the adjusting mechanisms 98a and 98b in order to give visual feedback on the current amount of radial or threshing clearance 88 to an operator conducting a visual inspection. Alternately, feedback may be provided to the operator in the operator cab 22 of the combine 10 by way of a gauge or other visual or audio device (not shown), or by way of an electronic yield monitor device (not shown).

The sensor or grain camera 90a attached to the outlet of the grain elevator 60 points towards the grain passing into the grain tank 28. Alternately, as shown in FIG. 4, the sensor or grain camera 90b attached to the outside of the cylindrical housing 84 points inwards into the cylindrical housing 84 where the tailings are being further threshed by the rotating drum 82, rasps 94, and (when provided) lugs 96.

The sensor or grain camera 90b is connected to a controller or a control system (hereinafter "controller") 106 via a signal line 91b. The sensor or grain camera 90b and the controller 106 cooperate to determine if too many pods, ears, or spikes of unthreshed grain are passing through the tailings processor 80 or if too much grain or too many kernels are being broken in the tailings processor 80. The controller 106 is connected to a control valve 105 via a signal line 105. The control valve 105 is disposed within the hydraulic circuit 110 of the combine 10 to control the actuator 92a. The control valve 105 operates to selectively provide hydraulic fluid from the hydraulic circuit 110 to the actuator 92a via a hydraulic supply line 93a or to selectively prevent hydraulic fluid from the hydraulic circuit 110 from being provided to the actuator 92a via the hydraulic supply line 93a.

In one exemplary embodiment, the sensor or grain camera 90b may be a digital camera that captures image(s) of the inside of the tailings processor 80 and encodes such captured image(s) as image data. In another exemplary embodiment, the sensor or grain camera 90b may be another type of sensor with imaging capabilities, such as ultrasound, thermal or infrared imaging, or radar imaging, as non-limiting examples. In such embodiment the sensor or grain camera 90b also generates relevant image data.

In one exemplary embodiment, the sensor or grain camera 90b transmits the image data to the controller 106 over the signal line 91b. The controller 106 receives the image data and processes it to determine whether too many pods, ears, or spikes of unthreshed grain are passing through the tailings processor 80 or whether too much grain or too many kernels are broken in the tailings processor 80. If the controller 106 determines that too many pods, ears, or spikes of unthreshed grain are passing through the tailings processor 80, the controller 106 determines that it is necessary to reduce the radial or threshing clearance 88 in order to increase the tailings processor 80 aggressiveness. On the other hand, if the controller 106 determines that too much grain or too many kernels are broken in the tailings processor, the controller 106 determines that it is necessary to increase the radial or threshing clearance 88 in order to decrease the tailings processor 80 aggressiveness. The controller 106 then determines the amount by which the housing floor 86 should be adjusted and transmits a signal over the signal line 107 to the control valve 105 to open it (to reduce the threshing clearance 88) or close it (to increase the threshing clearance 88).

In another exemplary embodiment, the sensor or grain camera 90b does not transmit the image data to the controller 106 over the signal line 91b but rather itself determines, from the image data, whether too many pods, ears, or spikes of unthreshed grain are passing through the tailings processor 80 or whether too much grain or too many kernels are broken in the tailings processor 80. If the sensor or grain camera 90b determines that too many pods, ears, or spikes of unthreshed grain are passing through the tailings processor 80, the sensor or grain camera 90b transmits a signal to controller 106 indicating this condition. The controller 106 receives this signal, which indicates that it is necessary to reduce the radial or threshing clearance 88 in order to increase the tailings processor 80 aggressiveness. On the other hand, if the sensor or grain camera 90b determines that too much grain or too many kernels are broken in the tailings processor 80, the sensor or grain camera 90b transmits a signal to controller 106 indicating this condition. The controller 106 receives this signal, which indicates that it is necessary to increase the radial or threshing clearance 88 in order to decrease the tailings processor 80 aggressiveness. In either case, the controller 106 then determines the amount by which the housing floor 86 should be adjusted and transmits a signal over signal line 107 to the control valve 105 to open it (to reduce the threshing clearance 88) or close it (to increase the threshing clearance 88).

In the case in which either the sensor or grain camera 90b or the controller 106 determines that too much grain or too many kernels are being broken in the tailings processor 80, the control system or controller 106, which is operably connected to the left hand actuator 92a, via the signal line 107, the control valve 105, and the hydraulic input line 93a, causes the left hand actuator 92a to retract, rotating the left hand adjusting mechanism 98a counter-clockwise by way of the lever arm 100a. The left end of the housing floor 86 is thereby raised by way of the cam 104a of the left hand adjusting mechanism 98a. Similarly, the control system or controller 106, which is operably connected to the right hand actuator 92b, via another signal line similar to the signal line 107, a control valve similar to the control valve 105, and a hydraulic input line similar to the hydraulic input line 93a, causes the right hand actuator 92b (not visible) to retract, rotating the right hand adjusting mechanism 98b (not visible) clockwise by way of the lever arm 100b (not visible). The right end of the housing floor 86 is thereby raised by way of the cam 104b of the right hand adjusting mechanism 98b. Following this adjustment, the control system or controller 106 again cooperates with the sensor or grain camera 90a or 90b to determine if too many pods, ears, or spikes of unthreshed grain are still passing through the tailings processor 80, or if too much grain or too many kernels are now being broken in the tailings processor 80, and makes further adjustment to the radial or threshing clearance 88 as necessary, in closed loop fashion and in real time.

In the case in which either the sensor or grain camera 90b or the controller 106 determines that too much grain or too many kernels are being broken in the tailings processor 80, then it is necessary to increase the radial or threshing clearance 88 in order to decrease the tailings processor 80 aggressiveness. In this case, the control system or controller 106 causes the left hand actuator 92a to extend, rotating the left hand adjusting mechanism 98a clockwise by way of the lever arm 100a, and the left end of the housing floor 86 is thereby lowered by way of the cam 104a of the left hand adjusting mechanism 98a. Similarly, the control system or controller 106 causes the right hand actuator 92b (not visible) to extend, rotating the right hand adjusting mechanism 98b (not visible) counter-clockwise by way of the lever arm 100b (not visible), and the right end of the housing floor 86 is thereby lowered by way of the cam 104b of the right hand adjusting mechanism 98b. Again, following this adjustment, the control system or controller 106 once more cooperates with the sensor or grain camera 90a or 90b to determine if too much grain or too many kernels are still being broken in the tailings processor 80, or if too many pods, ears, or spikes of unthreshed grain are now passing through the tailings processor 80, and makes further adjustment to the radial or threshing clearance 88 as necessary, in closed loop fashion and in real time.

Although the foregoing is described with respect to the sensor or grain camera 90b, the sensor or grain camera 90a is also connected to the controller 106 via a signal line 91a (not illustrated). The sensor or grain camera 90a cooperates with the controller 106 in a similar way to how the sensor or grain camera 90b cooperates with the controller 106. Thus, the sensor or grain camera 90a may either transmit image data to the controller 106 for determining whether too much grain or too many kernels are still being broken in the tailings processor 80, or whether too many pods, ears, or spikes of unthreshed grain are now passing through the tailings processor 80. Alternatively, the sensor or grain camera 90a may make such determination and transmit a signal to the controller 106 indicating the determination so that the controller 106 may control the actuators 92a and 92b accordingly.

Figure 9:
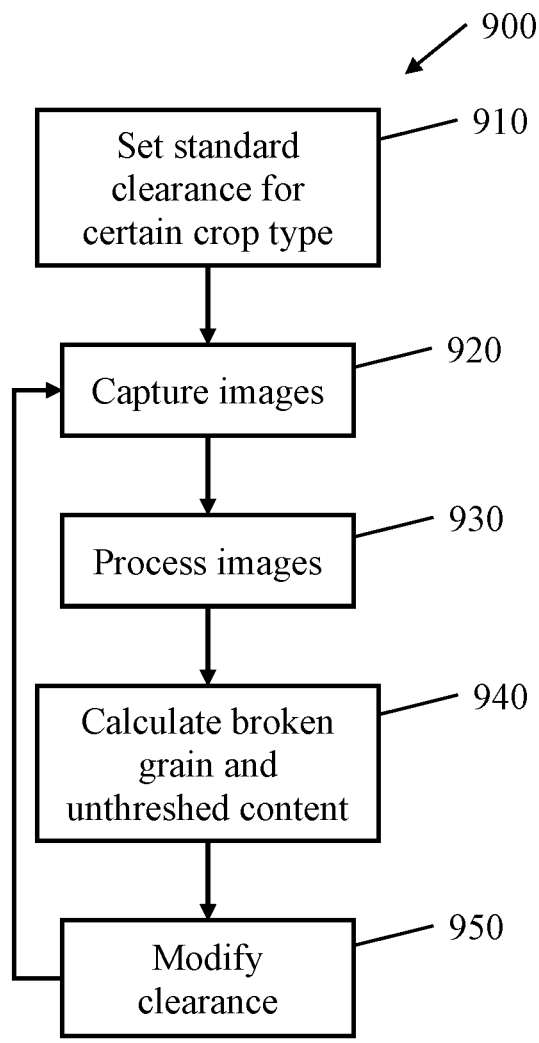
FIG. 9 illustrates a method of controlling the tailings processor of FIG. 4, in accordance with an exemplary embodiment of the present invention.

Referring now to FIG. 9, there is illustrated a method 900 of controlling the tailings processor of FIG. 4, in accordance with an exemplary embodiment of the present invention. The method 900 begins with a Step 910 of setting a standard clearance 88 by extending or contracting the actuators 92a, 92b. In an exemplary embodiment, the clearance 88 is set via a manual selection by an operator of the combine 10, such as, for example, by inputting or selecting a standard clearance 88 of the tailings processor 80 for a crop to be harvested in an interface in the cab 22 of the combine 10. Such selection is transmitted to the controller 106, which receives it in the Step 910 and based upon the inputted or selected standard clearance 88, the controller 106 commands the actuators 92a, 92b to extend or contract to achieve the clearance 88 which is standard for the crop. In an exemplary embodiment, in the Step 910, the controller 106 also receives an indication of a desired level of broken grain and/or unthreshed grain from the user. Such level may be low, medium, or high.

The method 900 continues to a Step 920, in which the grain camera 90a, 90b captures image(s) of the inside of the tailings processor 80 and encodes such captured image(s) as image data. In a Step 930, either the grain camera 90a, 90b or the controller 106 processes the image data, depending on which embodiment of processing is implemented. Based on the processed image data, either the grain camera 90a, 90b or the controller 106 calculates the broken grain and unthreshed grain content from the image data, Step 940. In an exemplary embodiment either the grain camera 90a, 90b or the controller 106 calculates the broken grain and unthreshed grain content as low, medium, or high.

The grain camera 90a, 90b or the controller 106 compares these amounts, e.g., low, medium, and high, to desired amounts, e.g., low, medium, or high, inputted by the user in the Step 910 to determine whether too much grain or too many kernels are still being broken in the tailings processor 80, or whether too many pods, ears, or spikes of unthreshed grain are now passing through the tailings processor 80 in the Step 940. Based on the determination made in the Step 940, the controller 106 commands the actuators 92a, 92b to extend or contract to achieve a desired clearance 88 to bring the calculated broken grain content and unthreshed content to its desired level input by the user in the Step 910. The method 900 then returns to the Step 920 to repeat the foregoing process. FIG. 10 illustrates an exemplary table of decision rules for controlling the clearance 88 based upon calculated broken grain and unthreshed grain content and desired broken grain and unthreshed grain content.

It is to be understood that the functionality of the control system or controller 106 described herein is performed by the control system or controller 106 upon loading and executing software code or instructions which are tangibly stored on a tangible computer readable medium 109, such as on a magnetic medium, e.g., a computer hard drive, an optical medium, e.g., an optical disc, solid-state memory, e.g., flash memory, or other storage media known in the art. Thus, any of the functionality performed by the control system or controller 106 described herein, such as the processing of the image data received from the sensor or grain cameras 90a, 90b, the generation of the control signal and transmission thereof over the signal line 107, and the steps of the method 900, is implemented in software code or instructions which are tangibly stored on the tangible computer readable medium 109. Upon loading and executing such software code or instructions by the control system or controller 106, the control system or controller 106 may perform any of the functionality of the control system or controller 106 and the method 900 described herein.

In the exemplary embodiment in which the sensor or grain camera 90a, 90b determines from the image data whether too much grain or too many kernels are being broken in the tailings processor 80, or whether too many pods, ears, or spikes of unthreshed grain are passing through the tailings processor 80, the sensor or grain camera 90a, 90b may also include a respective internal tangible computer readable medium 93b. In such embodiment, the functionality of the sensor or grain camera 90a, 90b described herein is performed by the sensor or grain camera 90a, 90b upon loading and executing software code or instructions which are tangibly stored on the tangible computer readable medium 93b, such as on a magnetic medium, e.g., a computer hard drive, an optical medium, e.g., an optical disc, solid-state memory, e.g., flash memory, or other storage media known in the art. Thus, any of the functionality performed by the sensor or grain camera 90a, 90b described herein, such as the processing of the image data and the transmission of the indication of whether too much grain or too many kernels are being broken in the tailings processor 80, or whether too many pods, ears, or spikes of unthreshed grain are passing through the tailings processor 80 over the signal line 91a, 91b to the controller 106, and the steps of the method 900, is implemented in software code or instructions which are tangibly stored on the tangible computer readable medium 93b. Upon loading and executing such software code or instructions by the sensor or grain camera 90a, 90b, the sensor or grain camera 90a, 90b may perform any of the functionality of the sensor or grain camera 90a, 90b described herein.

The term "software code" or "code" used herein refers to any instructions or set of instructions that influence the operation of a computing device, sensor, or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Figure 5:
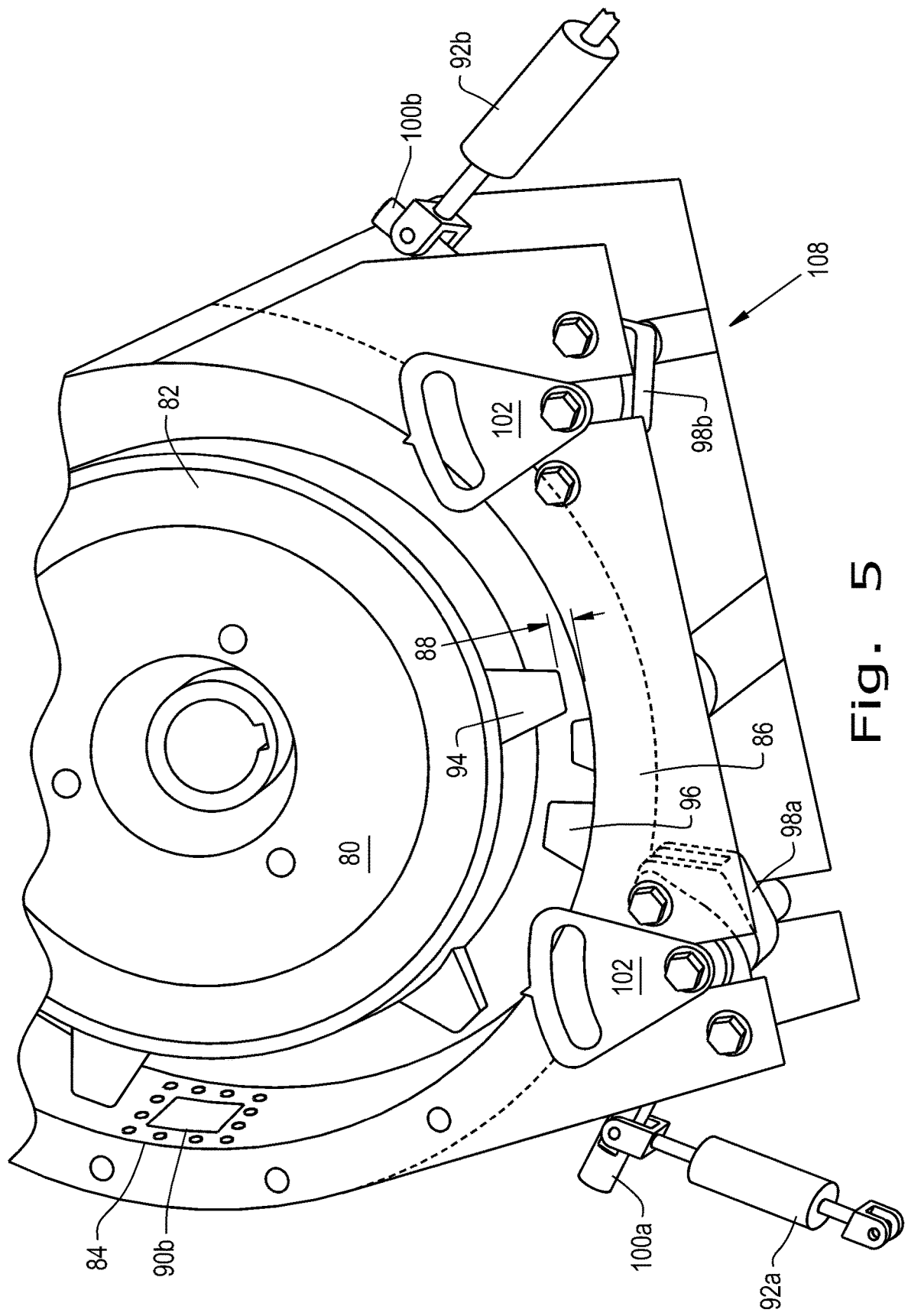
FIG. 5 is an isometric view of a tailings processor according to an embodiment of the invention.
Figure 6:
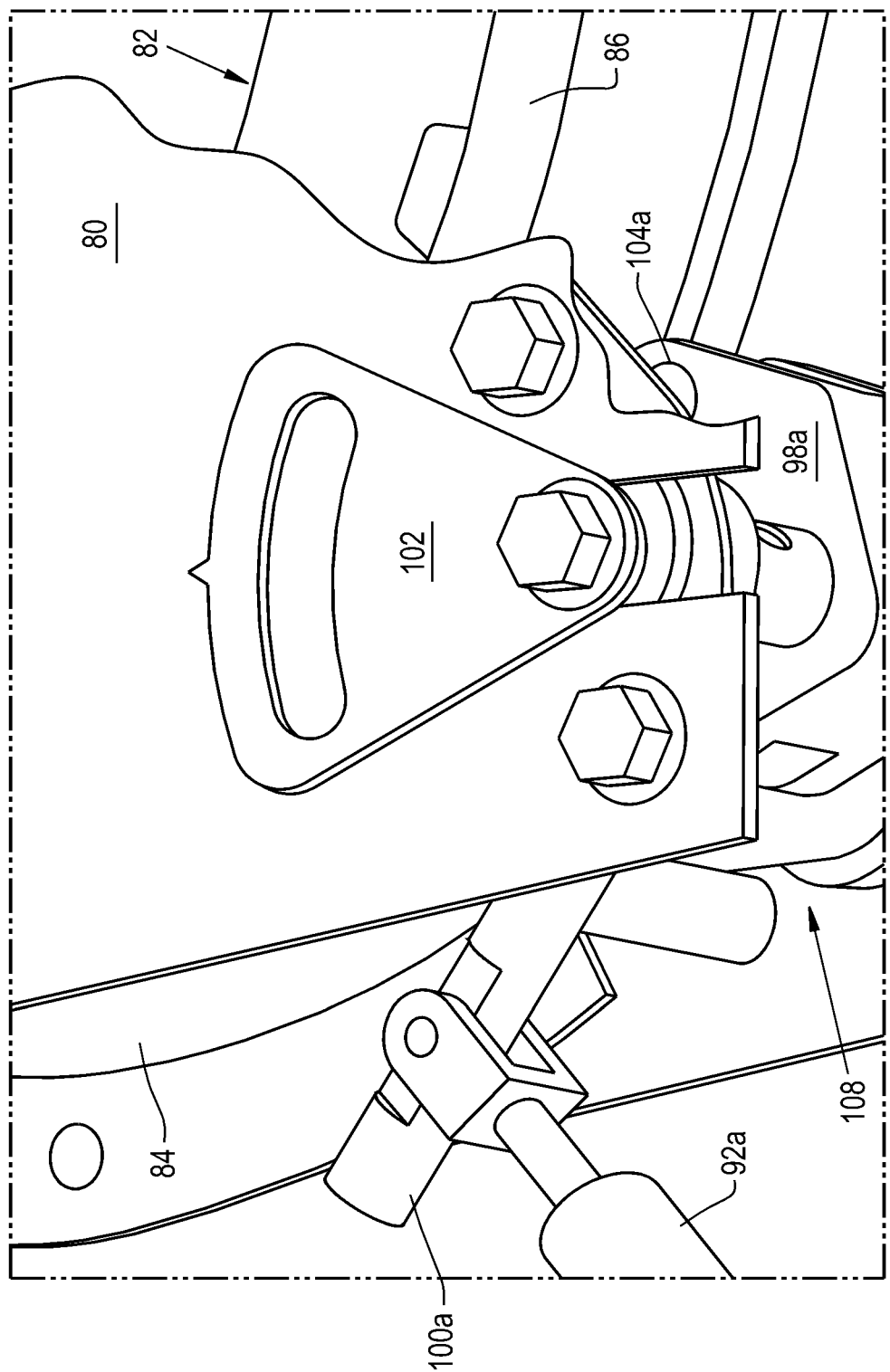
FIG. 6 is an isometric view of an adjusting mechanism of a tailings processor according to an embodiment of the invention.

Turning now to FIGS. 5 and 6, further detail is shown of the arrangement 108 to automatically adjust the aggressiveness of the tailings processor 80 in the form of adjusting mechanisms 98a and 98b connected to the housing floor 86 of the cylindrical housing 84 of the tailings processor 80 according to an embodiment of the present invention. As in the previous figures, rasps 94 are attached to the rotating drum 82, and cooperate with the lugs 96 attached to the housing floor 86 in order to further thresh the tailings on their way back to the upstream end of the cleaning system 26 (not shown). Again, the rasps 94 pass within a radial or threshing clearance 88 of the housing floor 86 as the rotating drum 82 turns, which radial or threshing clearance 88 may again be adjusted by the actuators 92a and 92b rotating the adjusting mechanisms 98a and 98b through lever arms 100a and 100b. The adjusting mechanisms 98a and 98b again operate to raise or lower the housing floor 86 upon rotation by way of cams 104a and 104b or other motion transmitting mechanism, thereby adjusting the radial or threshing clearance 88.

As can be seen in FIG. 5, if the sensor or grain camera 90b is attached to the cylindrical housing 84 of the tailings processor 80, the sensor or grain camera 90b opens into the interior of the cylindrical housing 84 of the tailings processor 80 in order to determine the effectiveness of the further threshing of the tailings. If the sensor or grain camera 90a attached to the outlet of the grain elevator 60 is used, it similarly opens into the interior of the outlet of the grain elevator 60, in order to determine the effectiveness of the re-threshing of the tailings by the tailings processor 80. This information is used to adjust the aggressiveness of the tailings processor 80 in order to optimize the re-threshing of the tailings, as described previously. Again, an indicator or indicators 102 may be connected to one or to each of the adjusting mechanisms 98 in order to give visual feedback on the current amount of radial or threshing clearance 88 to an operator conducting a visual inspection. Alternately, feedback may be provided to the operator in the operator cab 22 of the combine 10 by way of a gauge or other visual or audio device (not shown), or by way of an electronic yield monitor device (not shown).

Figure 7:
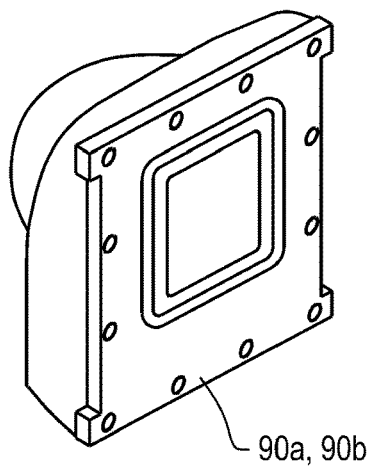
FIG. 7 is an isometric view of a sensor or grain camera used with a tailings processor according to an embodiment of the invention.
Figure 8A:
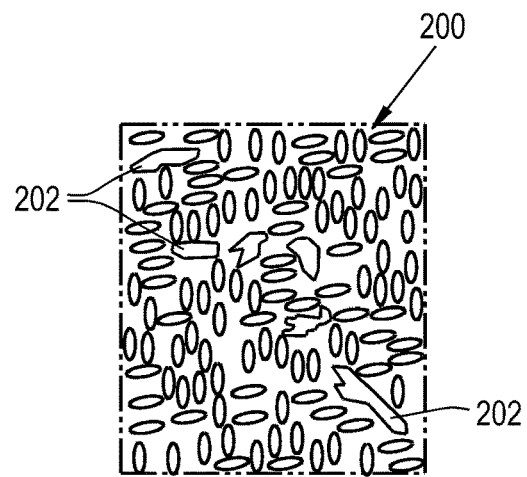
FIG. 8A is an illustration of a grain sample resulting from insufficiently threshed tailings.
Figure 8B:
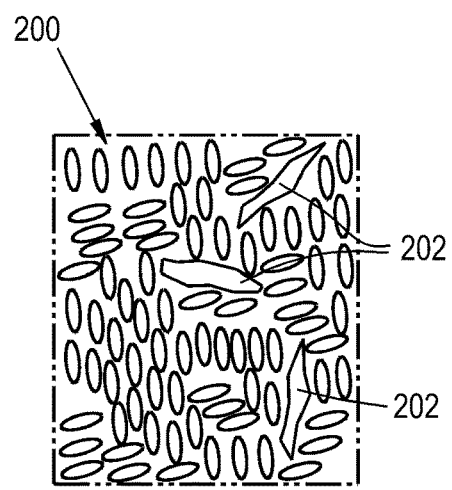
FIG. 8B is an illustration of a grain sample resulting from insufficiently threshed tailings.
Figure 8C:
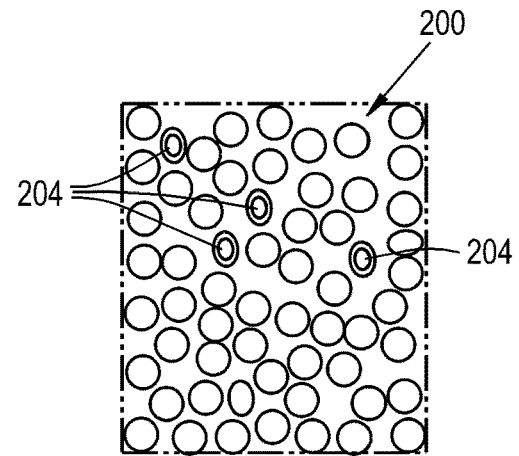
FIG. 8C is an illustration of a grain sample resulting from excessively threshed tailings.

Turning now to FIG. 7, an embodiment of the sensor or grain camera 90a or 90b is shown. The sensor or grain camera 90a or 90b is capable and operates to image grain having been re-threshed by the tailings processor 80. Independently or in cooperation with the control system or controller 106 (not shown), the sensor or grain camera 90a or 90b operates to identify in the grain sample 200 unthreshed grain pods, ears, and spikes 202, and to identify in the grain sample 200 broken grain 204, as shown in FIGS. 8A, 8B, and 8C. The controller or control system 106 uses this information to increase or decrease the radial or threshing clearance 88 in order to decrease or increase, respectively, the tailings processor 80 aggressiveness in closed loop fashion and in real time, as described above.

It is here noted that, for the sake of illustrative convenience, the sensor or grain camera 90a or 90b has been shown and described thus far as being located upon the outlet of the grain elevator 60 or upon the cylindrical housing 84 of the tailings processor 80, respectively. However, it is contemplated as being within the scope of the invention that the sensor or grain camera 90a or 90b may be located anywhere within the cleaning system 26, grain elevator 60, grain tank 28, or even on the unloading conveyance 30, provided that at least a portion of the grain sample 200 at that location has previously passed through the tailings processor 80 as tailings. Other such locations where a sensor or grain camera 90a or 90b according to an embodiment of the invention may be located include upon the front or rear surface of the tailings processor 80, attached to the return auger 66, attached to the bottom pan 58 of the cleaning system 26, or attached to the clean grain auger 56, as non-limiting examples.

While this invention has been described with respect to at least one embodiment, the present invention can be further modified within the scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

These and other advantages of the present invention will be apparent to those skilled in the art from the foregoing specification. Each discussed advantage may not be present in each embodiment. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A tailings processor for use in an agricultural harvester having a threshing and separating system, a grain cleaning system, a tailings auger and a return auger, a clean grain auger, a grain elevator having an outlet, and a grain tank, the tailings processor comprising:
    a threshing device for re-threshing tailings, the threshing device being configured for receiving the tailings from the tailings auger and for providing the re-threshed tailings to the return auger;
    an arrangement to automatically adjust the aggressiveness of the tailings processor to achieve a desired level of broken grain and/or unthreshed grain, the desired level being selected by a user of the agricultural harvester; and
    a system for controlling the aggressiveness of the tailings processor, the system comprising:
        at least one imaging device oriented to image a grain sample, at least a portion of the grain sample having passed through the tailings processor at least once; and
        a controller connected to the at least one imaging device and to the arrangement, the controller or the at least one imaging device determining from the image a level of broken grain and/or unthreshed grain, the controller configured to automatically adjust the aggressiveness of the tailings processor using the arrangement, based on the level of broken grain and/or unthreshed grain determined from the image from the at least one imaging device by comparing the level of broken grain and/or unthreshed grain to the desired level.

2. The tailings processor of claim 1, further comprising a housing, the arrangement to automatically adjust the aggressiveness of the tailings processor is configured to adjust a radial or threshing clearance between the threshing device and a section of the housing.

3. The tailings processor of claim 2, wherein the controller is configured to control the arrangement to reduce the radial or threshing clearance to increase the aggressiveness of the tailings processor when the at least one imaging device indicates an excess of amount of unthreshed grain is passing through the tailings processor.

4. The tailings processor of claim 2, wherein the controller is configured to control the arrangement to increase the radial or threshing clearance to decrease the aggressiveness of the tailings processor when the at least one imaging device indicates an excess of broken grain is passing through the tailings processor.

5. The tailings processor of claim 2, wherein the arrangement to automatically adjust the aggressiveness of the tailings processor further comprises:
    a movable section of the periphery of the housing, the movable section being configured to increase or decrease the radial or threshing clearance between the threshing device and the movable section;
    the movable section being connected to at least one adjusting mechanism; and
    the at least one adjusting mechanism is connected to and controlled by the controller.

6. The tailings processor of claim 5, wherein the threshing device further comprises a rotating drum having at least one rasp attached to it, the movable section further comprises a floor of the housing, the floor of the housing having at least one lug attached to it; and
    the radial or threshing clearance further comprises a clearance between an end of the at least one rasp distal to the rotating drum and the floor of the housing.

7. The tailings processor of claim 5, wherein the at least one adjusting mechanism further comprises at least one cam, at least one lever arm, and at least one actuator.

8. The tailings processor of claim 1, wherein the at least one imaging device is at least one of a digital camera, an ultrasonic imaging device, a thermal or infrared imaging device, and a radar imaging device.

9. The tailings processor of claim 1, wherein the at least one imaging device is attached to at least one of the tailings auger, the return auger, the clean grain auger, the grain elevator, the outlet of the grain elevator, and the housing of the tailings processor.

10. An agricultural harvester, comprising:
    a threshing and separating system;
    a tailings auger;
    a return auger; and
    a tailings processor, the tailings processor including:
        a threshing device for re-threshing tailings, the threshing device being configured for receiving the tailings from the tailings auger and for providing the re-threshed tailings to the return auger;
    an arrangement to automatically adjust the aggressiveness of the tailings processor to achieve a desired level of broken grain and/or unthreshed grain, the desired level being selected by a user of the agricultural harvester; and
    a system for controlling the aggressiveness of the tailings processor, the system comprising:
        at least one imaging device oriented to image a grain sample, at least a portion of the grain sample having passed through the tailings processor at least once; and
        a controller connected to the at least one imaging device and to the arrangement, the controller or the at least one imaging device determining from the image a level of broken grain and/or unthreshed grain, the controller configured to automatically adjust the aggressiveness of the tailings processor using the arrangement, based on the level of broken grain and/or unthreshed grain determined from the image from the at least one imaging device by comparing the level of broken grain and/or unthreshed grain to the desired level.

11. The agricultural harvester of claim 10, further comprising a housing, the arrangement to automatically adjust the aggressiveness of the tailings processor is configured to adjust a radial or threshing clearance between the threshing device and a section of the housing.

12. The agricultural harvester of claim 11, wherein the controller is configured to control the arrangement to reduce the radial or threshing clearance to increase the aggressiveness of the tailings processor when the at least one imaging device indicates an excess of amount of unthreshed grain is passing through the tailings processor.

13. The agricultural harvester of claim 11, wherein the controller is configured to control the arrangement to increase the radial or threshing clearance to decrease the aggressiveness of the tailings processor when the at least one imaging device indicates an excess of broken grain is passing through the tailings processor.

14. The agricultural harvester of claim 11, wherein the arrangement to automatically adjust the aggressiveness of the tailings processor further comprises:
   a movable section of the periphery of the housing, the movable section being configured to increase or decrease the radial or threshing clearance between the threshing device and the movable section;
   the movable section being connected to at least one adjusting mechanism; and
   the at least one adjusting mechanism is connected to and controlled by the controller.

15. The agricultural harvester of claim 14, wherein the threshing device further comprises a rotating drum having at least one rasp attached to it, the movable section further comprises a floor of the housing, the floor of the housing having at least one lug attached to it; and
   the radial or threshing clearance further comprises a clearance between an end of the at least one rasp distal to the rotating drum and the floor of the housing.

16. The agricultural harvester of claim 14, wherein the at least one adjusting mechanism further comprises at least one cam, at least one lever arm, and at least one actuator.

17. The agricultural harvester of claim 10, wherein the at least one imaging device is at least one of a digital camera, an ultrasonic imaging device, a thermal or infrared imaging device, and a radar imaging device.

18. The agricultural harvester of claim 10, wherein the at least one imaging device is attached to at least one of the tailings auger, the return auger, a clean grain auger, a grain elevator, an outlet of the grain elevator, and a housing of the tailings processor.

19. A method of processing tailings in an agricultural harvester having a threshing and separating system, a threshing device, a grain cleaning system, a tailings auger and a return auger, a clean grain auger, a grain elevator having an outlet, and a grain tank, the method of processing tailings comprising the steps of:
   receiving the tailings from the tailings auger;
   re-threshing the tailings in a tailings processor;
   providing re-threshed tailings to the return auger; and
   adjusting the aggressiveness of the tailings processor to achieve a desired level of broken grain and/or unthreshed grain, the desired level being selected by a user of the agricultural harvester, the adjusting being carried out by a system for controlling the aggressiveness of the tailings processor, the system carrying out the steps of:
      imaging a grain sample with at least one imaging device, at least a portion of the grain sample having passed through the tailings processor at least once;
      determining from an image taken in the imaging step a level of broken grain and/or unthreshed grain; and
      automatically adjusting the aggressiveness of the tailings processor based on the level of broken grain and/or unthreshed grain determined from the image from the at least one imaging device by comparing the level of broken grain and/or unthreshed grain to the desired level.

20. The method of processing tailings of claim 19, wherein the tailings processor is configured to adjust a radial or threshing clearance between the threshing device and a section of a housing of the tailing processor.

* * * * *